(12) United States Patent
Holtsclaw et al.

(10) Patent No.: US 8,276,663 B2
(45) Date of Patent: Oct. 2, 2012

(54) METHODS FOR REDUCING BIOLOGICAL LOAD IN SUBTERRANEAN FORMATIONS

(75) Inventors: Jeremy Holtsclaw, Lawton, OK (US);
Jimmie D Weaver, Duncan, OH (US);
Lindsey Gloe, Albuquerque, NM (US);
Michael A. McCabe, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 87 days.

(21) Appl. No.: 12/892,233

(22) Filed: Sep. 28, 2010

(65) Prior Publication Data

US 2012/0073821 A1    Mar. 29, 2012

(51) Int. Cl.
*E21B 43/16*    (2006.01)
*E21B 43/267*    (2006.01)
*C09K 8/86*    (2006.01)
*C09K 8/92*    (2006.01)

(52) U.S. Cl. ............ 166/279; 166/275; 166/280.1; 166/283; 166/305.1; 166/308.5; 175/72; 507/237; 507/920

(58) Field of Classification Search .............. None
See application file for complete search history.

(56) References Cited

U.S. PATENT DOCUMENTS

| | | | |
|---|---|---|---|
| 3,199,591 A | | 8/1965 | Kepley |
| 4,835,143 A | * | 5/1989 | Donofrio et al. ............... 514/75 |
| 4,874,526 A | * | 10/1989 | Grade et al. ............... 210/697 |
| 4,914,132 A | | 4/1990 | Donofrio et al. |
| 5,063,213 A | * | 11/1991 | Whitekettle et al. ........... 514/75 |
| 5,063,214 A | * | 11/1991 | Whitekettle et al. ........... 514/75 |
| 5,118,346 A | | 6/1992 | Wehner et al. |
| 5,198,453 A | * | 3/1993 | LaZonby et al. ............. 514/367 |
| 5,249,627 A | | 10/1993 | Harms et al. |
| 5,314,660 A | * | 5/1994 | Clark et al. ................ 422/15 |
| 5,604,186 A | | 2/1997 | Hunt et al. |
| 5,833,000 A | | 11/1998 | Weaver et al. |
| 5,853,048 A | | 12/1998 | Weaver et al. |
| 6,209,643 B1 | * | 4/2001 | Nguyen et al. .............. 166/276 |
| 6,439,309 B1 | | 8/2002 | Matherly et al. |
| 6,488,091 B1 | | 12/2002 | Weaver et al. |
| 7,044,220 B2 | | 5/2006 | Nguyen et al. |
| 7,131,491 B2 | | 11/2006 | Blauch et al. |
| 7,332,094 B2 | | 2/2008 | Abney et al. |
| 7,413,013 B2 | | 8/2008 | Welton et al. |
| 7,562,711 B2 | | 7/2009 | Flemma, Jr. et al. |
| 2005/0277554 A1 | | 12/2005 | Blauch et al. |
| 2006/0211580 A1 | | 9/2006 | Wang et al. |
| 2006/0234870 A1 | | 10/2006 | McCabe et al. |
| 2008/0135476 A1 | * | 6/2008 | Pescher et al. ............... 210/620 |
| 2008/0194427 A1 | | 8/2008 | Welton et al. |
| 2009/0229827 A1 | | 9/2009 | Bryant et al. |
| 2010/0239679 A1 | * | 9/2010 | Greene et al. ............... 424/490 |

FOREIGN PATENT DOCUMENTS

| | | |
|---|---|---|
| EP | 0 471 481 A2 | 2/1992 |
| WO | WO 00/11949 | 3/2000 |

OTHER PUBLICATIONS

Kramer, Jeffrey et al., "A New High Performance Quartenary Phosphonium Biocide for Microbiological Control in Oilfield Water Systems," NACE Corrosion 2008 Conference & Expo, Paper No. 08660, 2008.
European Search Report for Application No. 11183173.1 dated Jan. 17, 2012.

\* cited by examiner

*Primary Examiner* — George Suchfield
(74) *Attorney, Agent, or Firm* — Robert A. Kent; McDermott Will & EmeryLL

(57) ABSTRACT

Methods of treating subterranean formations to reduce bacteria load are provided. Some methods include the steps of providing a treatment fluid, particulates, and tri-n-butyl tetradecyl phosphonium chloride (TTPC) wherein the TTPC is in liquid form or in solution; coating the TTPC onto the particulates; combining the particulates coated with TTPC with the treatment fluid to create a suspension; and, placing the suspension into the portion of the subterranean formation. Other methods involve the use of TTPC in the form of a solid salt.

5 Claims, 6 Drawing Sheets

METHODS FOR REDUCING BIOLOGICAL LOAD IN SUBTERRANEAN FORMATIONS

BACKGROUND

The present invention relates to the treatment of bacteria contaminated subterranean formations, and more particularly, to methods of treating bacteria contaminated subterranean formations to substantially reduce or eliminate such contamination using tri-n-butyl tetradecyl phosphonium chloride (TTPC).

A biocide is a chemical substance capable of killing living organisms, usually in a selective way. Biocides are commonly used in medicine, agriculture, forestry, and in industry where they prevent the fouling of water and oil pipelines.

Biocides, also called bactericides or antimicrobials, are used in oil and gas production. Their aim is to kill microorganisms, especially bacteria, or interfere with their activity. Microorganisms in oilfields or in injection water are generally classified by their effect. Sulfate-reducing bacteria (SRBs), denitrifying bacteria (hNRB), slime-forming bacteria (NR-SOB), yeast and molds, and protozoa can be encountered in nearly any body of water present in and around an oil field. Bacteria may be found in solution (planktonic), as dispersed colonies or immobile deposits (sessile bacteria). Bacteria can use a wide variety of nitrogen, phosphorus, and carbon compounds (such as organic acids) to sustain growth. Nitrogen and phosphorus are usually sufficiently present in the formation water to sustain bacterial growth but injection of organic nitrogen- and phosphorus-containing chemicals in fluid inserted into the formation can further increase growth potential.

Bacteria in oilfield water can be aerobic or anaerobic. One known type of anaerobic bacteria are SRB (desulfovibrio) bacteria, which are present in nearly all waters handled in oilfield operations. SRB convert sulfate ions into hydrogen sulfide—leading to reservoir souring. SRB can also produce sludge or slime, which can reduce the porosity of the formation. Hydrogen sulfide is acidic and can in turn cause sulfide scales, most importantly, iron sulfides. In addition, it is often necessary to remove hydrogen sulfide from gas prior to sale. Solid deposits of bacterial colonies are called "biofilms" or "biofouling." The presence of iron sulfide or an increase in the water soluble sulfide concentration in a flow line is a strong indicator of microbially induced corrosion (MIC); therefore it is very important to prevent the formation of biofilms on the surfaces of flow lines and other production equipment. It is similarly important to have viable treatment strategies for both planktonic and sessile bacterial numbers. The potential for SRB activity is greater in the case of produced water reinjection (PWRI). Water that is reinjected can be a mixture of produced water and seawater. In such cases one had a mixture of SRB nutrients including sulfate ions, organic carbon, and nitrogen (often bound in ammonium compounds). There are SRB that can survive extremes of temperature, pressure, salinity, and pH but their growth is particularly favored in the temp range of about 40° F. to about 175° F.

When the fluids used in drilling or stimulating oil or gas wells contain bacteria, the producing formations can become contaminated with the bacteria. Such contaminated formations which have been fractured have heretofore been particularly difficult or impossible to treat. That is, prior attempts to introduce one or more bactericides into such formations to contact and kill the bacteria therein have been largely unsuccessful due to the bacteria being located in or near fractures at long distances from the well bores. When treating fluids containing bactericides have been pumped into such previously fractured contaminated formations, the treating fluids have either failed to reach the locations of the bacteria, and/or the proppant materials in the previously formed fractures have been disturbed thereby reducing the productivities of the formations.

In order for a biocide to be compatible and effective, it should be stable, and preferably, it should not react with or adversely affect components of the treatment fluid or formation. Incompatibility of a biocide in a well bore treatment fluid can be a problem, leading to treatment fluid instability and potential failure. Biocides may comprise quaternary ammonium compounds, chlorine, hypochlorite solutions, and compounds like sodium dichloro-s-triazinetrione. An example of a biocide that may be used in subterranean applications is glutaraldehyde.

By the present invention, improved methods of treating previously fractured bacteria contaminated subterranean formations are provided whereby the bacteria are substantially eliminated without lowering the productivities of the formations.

SUMMARY

The present invention relates to the treatment of bacteria contaminated subterranean formations, and more particularly, to methods of treating bacteria contaminated subterranean formations to substantially reduce or eliminate such contamination using tri-n-butyl tetradecyl phosphonium chloride (TTPC).

Some embodiments of the present invention provide methods of treating a portion of a subterranean formation, comprising: providing a treatment fluid, particulates, and TTPC wherein the TTPC is in liquid form or in solution; coating the TTPC onto the particulates; combining the particulates coated with TTPC with the treatment fluid to create a suspension; and, placing the suspension into the portion of the subterranean formation.

Other embodiments provide methods of treating a portion of a subterranean formation, comprising: providing a treatment fluid and TTPC wherein the TTPC is in the form of a solid salt; placing a coating onto the solid TTPC wherein the coating is selected from a group consisting of degradable coating materials, non-aqueous tackifying agents; aqueous tackifying agents; silyl-modified polyamide compounds; or resin; combining the coated, solid TTPC with the treatment fluid to create a suspension; and, placing the suspension into the portion of the subterranean formation.

Still other embodiments provide methods of treating a portion of a subterranean formation, comprising: providing a treatment fluid, TTPC, a crosslinker, and an anionic crosslinkable polymer; crosslinking the anionic crosslinkable polymer with the crosslinker in the presence of the TTPC to form a gel matrix; combining the gel with the treatment fluid to create a treatment fluid mixture; and, placing the treatment fluid mixture into the portion of the subterranean formation.

The features and advantages of the present invention will be readily apparent to those skilled in the art upon a reading of the description of the preferred embodiments that follows.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

Figure 1:
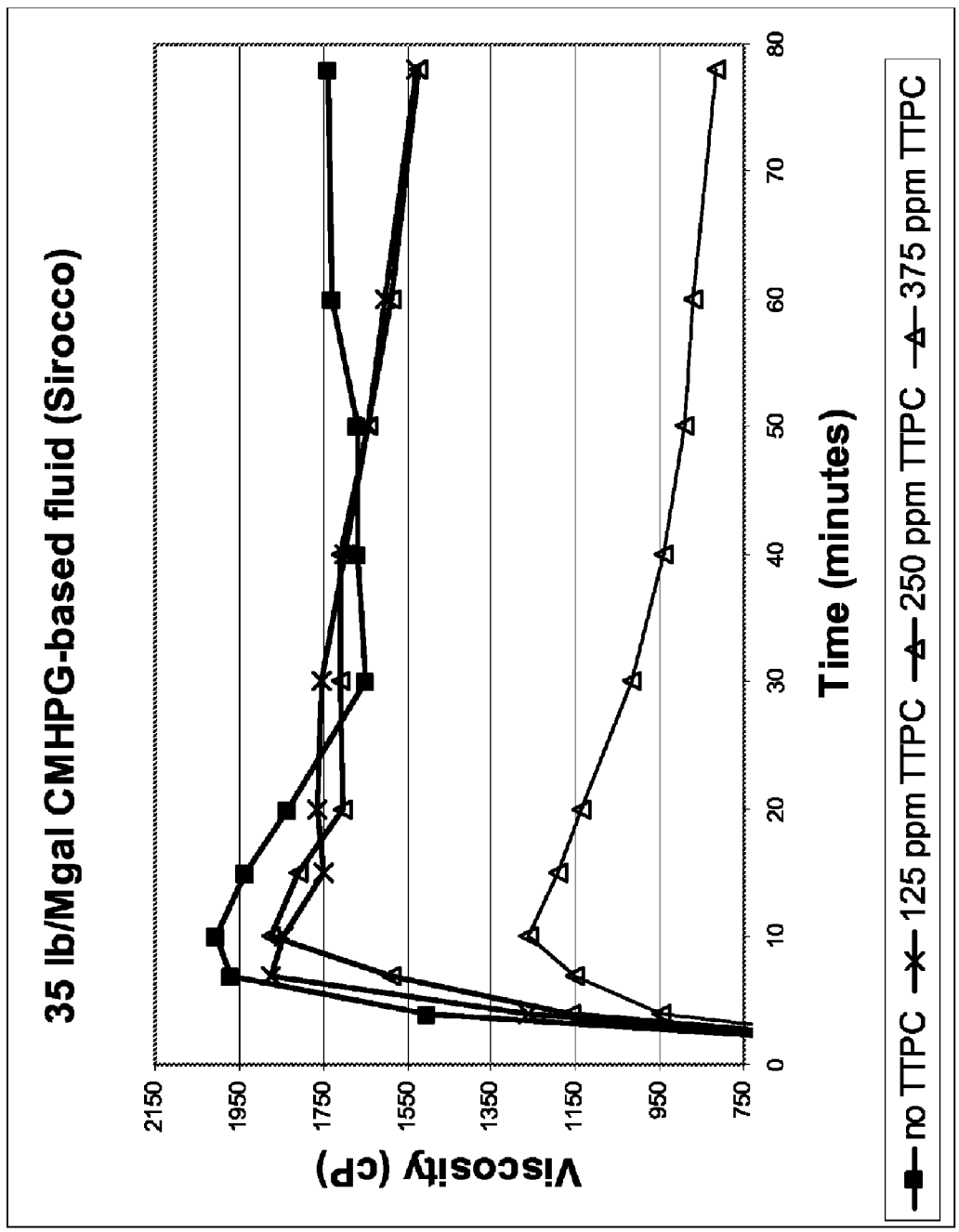
FIG. 1 shows compatibility of carboxymethyl hydroxypropyl guar (CMHPG) fluid and TTPC.

The present invention relates to the treatment of bacteria contaminated subterranean formations, and more particularly, to methods of treating bacteria contaminated subterranean formations to substantially reduce or eliminate such contamination using treatment fluids comprising tri-n-butyl tetradecyl phosphonium chloride (TTPC).

In subterranean formations, bacteria contamination can be naturally occurring or can be introduced with treatment fluids such as drilling, injection, or fracturing fluids. In cases where contamination is introduced or spread by a treatment fluid, the bacteria might be carried from the near well bore to long distances into the formation by traveling with the treatment fluid itself. Organic biocides, such as the biocide of the present invention, may be used to reduce hydrogen sulfide production, sulfide scaling, biofouling, and corrosion thereby increasing well productivity. Biocides may be particularly useful in operations that involve the injection of seawater into a subterranean operation for increased reservoir pressure or enhanced oil recovery. As noted, bacteria are nearly universally present in seawater, particularly SRBs. SRBs present in the seawater and the hydrogen sulfide formed by them can cause significant damage, known as microbially induced corrosion, to production equipment; causing pitting and potentially hole formation in equipment. For example, in the natural gas industry, it has been estimated that up to 30% of the pipeline failures due to corrosion involve microbially induced corrosion.

TTPC is generally more thermally stable than oxidizing biocides and thus may be suitable for higher-temperature applications. In some embodiments, TTPC may be stable up to about 575° F. Moreover, TTPC is generally less damaging to oilfield fluids than many oxidizing breakers which might interact negatively with viscosifiers, friction reducers, etc. and TTPC is more tolerant of anionic polymers than many known biocides. In some preferred embodiments, TTPC may be used with polyacrylamide/acrylate derivative viscosified treatment fluid in place of, for instance, sodium hypochlorite, butylaldehyde, AMB-100 (diazmat), or gluteraldehyde—all of which may negatively effect the viscosity of the treatment fluid.

The methods of the present invention use TTPC as a biocide in a hydrocarbon producing zone of a subterranean operation. The TTPC can be used in any available form, including a liquid solution or a solid salt. The salt forms of TTPC can be formed with any common anion, suitable examples include but are not limited to nitrate, bromide, iodine, acetate, propionate, or methyl sulfate. TTPC is unique, at least in part because it combines a quaternary phosphonium group with a long chain alkyl common in quaternary ammonium biocides. In addition, TTPC has excellent thermal stability, showing little or no thermal degradation even at temperatures up to 570° F. BWA Water Additives of Ticker, Ga. is a commercial provider of TTPC, offering the product as BELLACIDE® 350 (a 50% aqueous solution of TTPC) or BELLACIDE® 355 (a 5% aqueous solution of TTPC).

In some embodiments of the present invention, a biocide comprising TTPC may be combined with a treatment fluid in an amount effective to contact and kill at least a portion of the bacteria in the portion of the formation to be treated when the resulting biocide-treatment fluid mixture is introduced thereto.

Depending on the known or suspected location of the bacteria or the region desired to be treated, the biocide-treatment fluid mixture may be introduced at varying flow rates. For example, where bacteria is believed to have penetrated far from the near well bore area due to the action of, an earlier fracturing treatment, it may be desirable to introduce the bactericide-treatment fluid mixture at a rate and pressure sufficient to re-fracture the formation, and thereby cause the bactericide to be distributed throughout at least a portion of the formation. Such as re-fracturing treatment may be conducted in a conventional manner to reopen the original fractures or otherwise place fractures near the original fractures whereby the fracturing fluid and bactericide reach the original propped fracture beds, either directly or by flowing through the pores in the formation from new fractures to the old fracture beds. Any new fractures, whether coincident with the original fractures or not, are preferably propped in the usual manner by proppant material carried into the fractures with the fracturing fluid. While the exact control of the location of the new fractures is not always possible, the new fractures may lie relatively close to the original propped fracture beds whereby the leak off of the fracturing fluid and bactericide flows into the original fracture beds, contacting and killing bacteria contained therein.

In other embodiments, it may be desirable to place the biocide-treatment fluid mixture at or below matrix flow rates. As used herein, the term "matrix flow rate" means a flow rate which is high enough to allow the fluid to move through the matrix of particulates and the formation but below that which will form or enhance fractures in the formation. Treatments that proceed at levels below the matrix rate are generally preferred when the object is to treat the reservoir itself.

In some preferred embodiments, the biocide is added on-the-fly as a liquid or in solid salt form to a subterranean treatment operation such as a fracturing, drilling, frac-packing, injection, or gravel packing operation. The biocide may be particularly well-suited as an additive to a cellulosic fracturing fluid using gelling agents such as carboxymethylguar, carboxymethylhydroxyethylguar, carboxymethylhydroxypropylguar, hydroxyethyl celluloses, carboxyethylcellulose, carboxymethylcellulose, carboxymethylhydroxyethylcellulose, and any derivative and combination thereof.

In other embodiments, the biocide may be adsorbed unto a particulate substrate and placed into a subterranean formation for time delayed release. Particulates suitable for use as an absorption base include sand, hydrophobic silica, hydrophilic silica, fumed silica, precipitated silica, clay particulates, diatomaceous earth particulates, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof or any other particulate capable of accepting the TTPC without negatively affecting its ability to act as a biocide. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, and fly ash. The particle size should be chosen to correspond to the operation being performed (such as a gravel packing or a fracturing operation) and the mean particulate size generally may range from about 2 mesh to about 400 mesh on the U.S. Sieve Series. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof.

In general, absorbing the biocide onto particulates may be done in any way known in the art. By way of example, the particulates may be soaked in biocide and then allowed to dry or the biocide may be misted onto the particulates. That is, the TTPC may be allowed to contact the particulate and then be allowed to dry. TTPC is a cationic molecule, thus in many cases it will preferentially attach to particulates commonly used in subterranean operations, such as proppant or gravel. In some preferred embodiments, the particle having TTPC thereon may then be coated with a porous coating such that when the coated particle is placed into a treatment fluid the TTPC will diffuse from the particulate into the fluid. One example of a suitable coating process can be found in U.S. Pat. No. 5,604,186, the entire disclosure of which is hereby incorporated by reference.

In some embodiments it may be desirable to coat at least a portion of the particulates having biocide absorbed thereon with a degradable coating that will degrade over time and thus release the biocide over time. Suitable degradable coatings include degradable polymers, waxes, and latexes. Degradable polymers suitable for use in the present invention are capable of undergoing an irreversible degradation down hole. The term "irreversible" as used herein means that the degradable material, once degraded down hole, should not recrystallize or reconsolidate while down hole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of a physical change, chemical process, or a thermal process. Suitable examples of degradable polymers that may be used in accordance with the present invention include, but are not limited to, polysaccharides; cellulose; chitins; chitosans; proteins; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); poly(vindylidene chloride); and polyphosphazenes. Of these suitable polymers, aliphatic polyesters and polyanhydrides are preferred. Additional detail regarding acceptable degradable polymers can be found in U.S. Pat. No. 7,044,220, the entire disclosure of which is hereby incorporated by reference.

In still other embodiments, the TTPC biocide may be coated directly onto solid fluid loss control agents used in a subterranean treatment fluid. By placing the biocide onto fluid loss control particles, the methods of the present invention are able to place the biocide directly at the fracture face, thus potentially stopping the influx of harmful bacteria before they reach producing zones. Any solid fluid loss control agent known in the art may be used to deliver the biocide in these embodiments of the present invention. Some common fluid loss control agents include silica, mica, calcite, aliphatic polyester, polylactic acid, a poly(lactide), a poly(orthoester), a surfactant-based fluid loss control agent (such as those described in U.S. Pat. No. 7,413,013), carboxymethylcellulose, carboxyethylcellulose, and polyacrylates.

Other time delayed release embodiments suitable for use in the present invention involve dispersing TTPC into a polymer encagement for release over time. U.S. Patent Application Published No. 2006/0234870, published Oct. 19, 2006 and the entire disclosure of which is hereby incorporated by reference, describes the methods and materials suitable for use in encaging treatment chemicals into a polymer carrier matrix for delayed release. In some preferred embodiments the polymer selected for the encagement is preferably anionic (such as crosslinked polyamide or crosslinked polyacrylate), thus allowing the polymer to attract and physically capture the cationic TTPC as the polymer is being crosslinked. While any suitable method known in the art may be used, one embodiment of forming the gel matrix comprising TTPC involves placing the TTPC in a reaction chamber with the polymer and crosslinker and allowing the polymer to trap the TTPC within the crosslinked matrix as it forms. Preferably, the polymer is included in solution with the TTPC in an amount from about 10% to about 40% of the total mixture, or any subset of that range. Another method involves placing the TTPC in a reaction chamber with a monomer and polymerizing the monomer (with or without crosslinker) while allowing the polymer to trap the TTPC within the polymer as it forms. Preferably, the monomer is included in solution with the TTPC is an amount from about 10% to about 60% of the total mixture, or any subset of that range. The choice of the polymer, crosslinker, and the physical conditions of the subterranean formation may each affect the release of the TTPC from the polymer matrix over time. That is, depending upon the conditions, the TTPC trapped within the polymer matrix will be released either by physical diffusion over time as the molecules work free of the stable gel or will be released as a combination of diffusion and as a result of the degradation of the polymer matrix itself.

In other embodiments, it may be desirable to combine the use of the biocide with a scale inhibitor. Slightly soluble inorganic salts, for example calcium carbonate, calcium sulfate, and barium sulfate, often precipitate from waters produced along with oil and gas. This precipitation occurs when conditions that affect solubility, such as temperature, pressure, or concentration change. Additionally, incompatible waters can mix with formation waters in or near the well bore. Precipitates of slightly soluble salts are often called scale. Scale build-up occurs both within the near well bore formation and within the well bore equipment. Scale build-up within the formation decreases permeability and impairs well productivity. Scale build-up within well bore equipment shortens equipment useful life and can plug production tubing.

Any type of scale inhibitor known in the art may be combined with the biocide used in the present invention. Known scale inhibitors include phosphate esters, phosphonates, and organic polymers. Use of phosphate esters may be preferred in embodiments wherein the subterranean formation or treatment fluid is acidic. Generally, phosphate esters are stable to temperatures up to about 200° F. Phosphate esters are known to be very effective inhibitors of calcium carbonate ($CaCO_3$) and calcium sulfate ($CaSO_4$) and, in pH conditions above about 5.5 they are also known to provide control of strontium sulfate ($SrSO_4$) and barium sulfate ($BaSO_4$) precipitation. Phosphonates are available for scale inhibition in a variety of forms, each having its own thermal stability, calcium tolerance and efficiency relative to scale type. Organic polymers suitable for use as scale inhibitors are chiefly crystal distorters, which act by modifying or distorting crystal shapes, organic polymers (primarily low molecular weight polyacrylics) prevent scales from growing and adhering to equipment surfaces. Organic polymer inhibitors are generally stable to about 400° F. or higher, and are generally effective at very low concentrations for control of CaCO and $BaSO_4$ in waters containing low concentrations of scale-forming ions. In some embodiments it may be desirable to combine more than one type of scale inhibitors with the biocide used in the present invention.

In still other embodiments it may be desirable to combine the TTPC biocide with a tackifying agent before placement in a subterranean formation. In such embodiments, it is often desirable to coat a mixture of the tackifying agent and biocide onto a particulate and then place the particulates into the subterranean formation.

In embodiments wherein the biocide is combined with a tackifying agent, the tackifying agent may act as a delivery mechanism, particularly in the case where a solid salt of TTPC is mixed into the tackifying agent before coating onto a particulate. Moreover, placing the biocide into the tackifying agent may provide a time release function as the TTPC diffuses out of the tackifying agent layer. Suitable particulates may comprise proppant or gravel or any other particulate suitable for placement into a subterranean formation as part of a treatment operation such as those described above.

Any substance known for use as a tackifying agent may be used in these embodiments of the present invention. In some embodiments, the tackifying agent may be chosen from the group consisting of: non-aqueous tackifying agents; aqueous tackifying agents; and silyl-modified polyamide compounds. Combinations of these also may be suitable.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and combinations thereof. Methods of determining suitable aqueous tackifying compositions and additional disclosure on aqueous tackifying compositions can be found in U.S. Patent Application Publication No. 2005/0277554, filed Jun. 9, 2004, and U.S. Pat. No. 7,131,491 issued Nov. 7, 2006, the relevant disclosures of which are hereby incorporated by reference. Others that may be suitable include those described in U.S. Pat. No. 5,249,627, the relevant disclosure of which is incorporated herein by reference.

Non-aqueous tackifying compositions suitable for use in the present invention comprise substantially any non-aqueous substance that, when in liquid form or in a solvent solution, will form a coating upon a particulate. One example of a suitable group of non-aqueous tackifying compositions comprises polyamides which are liquids or in solution at the temperature of the subterranean formation such that the polyamides are, by themselves, non-hardening when present on the particulates introduced into the subterranean formation. A particularly preferred product is a condensation reaction product comprised of commercially available polyacids and a polyamine. Such commercial products include compounds such as mixtures of C36 dibasic acids containing some trimer and higher oligomers and small amounts of monomer acids that are reacted with polyamines. Other polyacids include trimer acids, synthetic acids produced from fatty acids, maleic anhydride and acrylic acid and the like. Such acid compounds are commercially available from companies such as Akzo Nobel, Union Camp, Chemtall, and Emery Industries. The reaction products are available from, for example, Champion Technologies, Inc. and Witco Corporation. Additional compounds that may be used as tackifying compounds include liquids and solutions of, for example, polyesters, polycarbonates and polycarbamates, shellac, and the like. Suitable tackifying compounds are described in U.S. Pat. No. 5,853,048 issued to Weaver, et al. and U.S. Pat. No. 5,833,000 issued to Weaver, et al., the disclosures of which are herein incorporated by reference.

Silyl-modified polyamide compounds suitable for use as an adhesive substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

In some embodiments of the present invention, the biocide may be combined with a treatment fluid for placement into the subterranean formation. As used herein, the term "treatment fluid" refers to any fluid that may be used in a subterranean application in conjunction with a desired function and/or for a desired purpose. The term "treatment fluid" does not imply any particular action by the fluid or any component thereof. Treatment fluids suitable for use in the present invention may be either gelled or un-gelled, depending on the treatment chosen to place the biocide into the subterranean formation. By way of example, in embodiments wherein the treatment is a fracturing treatment, gelled or gelled and crosslinked treatment fluids may be desirable. By contrast, where it is desirable to place the biocide as part of an injection well treatment, gelling agents are generally undesirable. And in situations wherein it is desirable to place a biocide in a water-sensitive formation, the use of a foamed treatment fluid may be desirable.

Essentially any treatment fluid suitable for an operation such as injection, fracturing, frac-packing, etc., may be used in accordance with the present invention, including aqueous gels, viscoelastic surfactant gels, oil gels, foamed gels, and emulsions. Suitable aqueous gels are generally comprised of water and one or more gelling agents. Suitable emulsions may be comprised of two immiscible liquids such as an aqueous gelled liquid and a liquefied, normally gaseous fluid, such as nitrogen. Where desired, foams can be created by the addition of a gas, such as carbon dioxide or nitrogen.

By way of example, the aqueous base fluid of embodiments of the treatment fluids of the present invention may be any fluid comprising an aqueous component. Suitable aqueous components include, but not limited to, fresh water, salt water, brine (e.g., saturated or unsaturated saltwater), seawater, pond water and any combination thereof. Generally, the aqueous component may be from any source. Suitable aqueous base fluids may include foams. In certain embodiments, the viscosifying agents of the present invention may not be soluble in brines. To solve this problem, in one embodiment of the present invention, the viscosifying agent may be hydrated in fresh water prior to addition of the salt solution. One of ordinary skill in the art, with the benefit of the present disclosure, will recognize suitable aqueous base fluids for use in the treatment fluids and methods of the present invention. In some embodiments, the aqueous base fluid may be present in a treatment fluid of the present invention in an amount in the range of about 75% to about 99.9% of the treatment fluid.

A variety of gelling agents may be used to increase the viscosity of the treatment fluids, including hydratable polymers that contain one or more functional groups such as hydroxyl, carboxyl, sulfate, sulfonate, amino, or amide groups. Suitable gelling agents typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. Polysaccharides are commonly used as gelling agents in subterranean operations, examples of suitable polysaccharides include, but are not limited to, cellulose derivatives, carboxymethylguars, carboxymethylhydroxyethylguars, carboxymethylhydroxypropylguars, hydroxyethyl celluloses, carboxyethylcelluloses, carboxymethylcelluloses, carboxymethylhydroxyethylcelluloses, diutan gums, xanthan gums, galactomannans, hydroxyethylguars, hydroxypropylguars, scleroglucans, wellans, starches, acrylamides, acylates and any derivative and combination thereof.

Additionally, synthetic polymers and copolymers that contain the above-mentioned functional groups may be used as gelling agents to increase the viscosity of the treatment fluids used in the present invention. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified carrier fluids of the present invention in an amount in the range of from about 0.1% to about 5% by weight of the water therein. In certain exemplary embodiments, the gelling agents are present in the viscosified carrier fluids of the present invention in an amount in the range of from about 0.01% to about 2% by weight of the water therein.

In embodiments wherein it is desirable to include a fluid loss control agent, the agent may be added to the treatment fluid, generally in an amount ranging from 0.1% to about 10% by weight of the overall treatment fluid composition. When used, the fluid loss control agent may preferably be a material that will degrade over time in the subterranean formation. Suitable such degradable fluid loss control materials include any of those known in the art. In some embodiments, the fluid loss control materials may comprise one or more of an aliphatic polyester, polylactic acid, a poly(lactide), or a poly(orthoester).

In some embodiments of the present invention, the treatment fluid may comprise a gelling agent and a crosslinking agent for crosslinking the gel and further increasing the viscosity of the fluid. Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan, Okla. Suitable crosslinkers generally are present in the viscosified treatment fluids in an amount sufficient to provide, among other things, the desired degree of crosslinking between gelling agent molecules. In certain exemplary embodiments of the present invention, the crosslinkers may be present in an amount in the range from about 0.001% to about 10% by weight of the water in the treatment fluid. In certain exemplary embodiments of the present invention, the crosslinkers may be present in the viscosified treatment fluids in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous treatment fluids to revert to thin fluids that can be produced back to the surface after they have been used to place proppant particles in subterranean fractures. The gel breaker used is typically present in the treatment fluid in an amount in the range of from about 0.5% to about 50% by weight of the gelling agent. The treatment fluids may also include one or more of a variety of well-known additives, such as gel stabilizers, fluid loss control additives, clay stabilizers, bactericides, and the like.

In some embodiments of the present invention, the TTPC may be combined with one or more traditional biocides, either oxidizing or nonoxidizing organic biocides, to achieve a synergistic biocidal effect. In some preferred embodiments, the TTPC may be combined with an oxidizing biocide. Traditionally, oxidizing biocides are used as the primary treatment with nonoxidizing organic biocides acting as secondary bacterial control. Traditional oxidizing biocides include chlorine; hypochlorite; hypochlorite salts (such as sodium-, lithium-, or calcium-hypochlorite); bromine; hypobromite salts (such as sodium-, lithium-, or calcium-hypobromite), bromine chloride; hydroxyl radicals; chlorine dioxide; hydrogen peroxide; sodium hydroxide; and hydrogen peroxide. Traditional organic nonoxidizing biocides known for use in oilfield applications include chloramines; tetrahydro-3,5-dimethyl-2H-1,3,5-thiadiazine-2-thione; 5-chloro-2-methyl-4-isothiazolin-3-one; 2-methyl-4-isothiazolin-3-one; 1,2-benzisothiazolin-3-one; tetrakis(hydroxymethyl) phosphonium sulfate; zinc pyrithione; 2-(thiocyanomethylthio)benzothiazole; 2,2-dibromo-3-nitropropionamide; benzalkonium chloride; benzyl C10-16 alkyldimethyl ammonium chloride; didecyl-dimethyl-ammonium chloride; formaldehyde; glutaraldehyde; N-coco alkyl-1,3,-propylenediamine acetate; hexahydro-1,3,5-triethyl-s-triazine; alkyl-aryl triethylammonium chloride solution; methylene bis(thiocyanate); 2,2-dibromo-nitrilopropionamide; 2-bromo-2-nitropropane-1,3-diol; 2-methyl-5-nitroimidazole-1-ethanol; quaternary ammonium glutaraldehyde; biguanidine; alkyl dimethyl benzyl ammonium chloride (ADBAC); dialky; dimethyl ammonium chloride (DDAC); and tetrakishydroxymethyl phosphonium sulfate (THPS). In some preferred embodiments the TTPC, a fast acting biocide, may be combined with a slower acting biocide to provide an initial bioburden reduction followed by a sustained bioburden reduction. One such suitable combination is TTPC with tetrahydro-3,5-dimethyl-2H-1,3,5-thiadiazine-2-thione in the form of AMB-100, a long term liquid antimicrobial agent containing 24% tetrahydro-3,5-dimethyl-2H-1,3,5-thiadiazine-2-thione in a true solution that is readily dispersible in water (available from Sooner Energy Services, a Flotek Company, in Norman, Okla.).

Also, in some embodiments, other additives may optionally be included in the treatment fluids such as salts, buffers, pH control additives, gas generators, enzyme substrates, additional surfactants (e.g., non-ionic surfactants), fluid loss control additives, acids, gases (e.g., nitrogen, carbon dioxide), surface modifying agents, tackifying agents, foamers, corrosion inhibitors, additional scale inhibitors, catalysts, clay control agents, friction reducers, antifoam agents, bridging agents, dispersants, flocculants, $H_2S$ scavengers, $CO_2$ scavengers, oxygen scavengers, lubricants, weighting agents, relative permeability modifiers, resins, wetting agents, and coating enhancement agents.

In addition, some embodiments of the present invention (particularly those embodiments wherein the treatment fluid is placed at a rate and pressure sufficient to fracture the formation) it may be desirable to include particulates capable of acting as proppant into the treatment fluid. Particulates suitable for use in the present invention may comprise any material suitable for use in subterranean operations. Suitable materials for these particulates may include, but are not limited to, sand, bauxite, ceramic materials, glass materials, polymer materials, polytetrafluoroethylene materials (commonly sold under the trade name TEFLON®), nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulate size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

To facilitate a better understanding of the present invention, the following examples of preferred embodiments are given. In no way should the following examples be read to limit or define the scope of the invention.

EXAMPLES

Example 1

Phenol red media vials (VW Enterprises #BB-PR) were used to determine the effectiveness of the identified biocides at recommended high and low concentrations. In the presence of bacteria the media vials turn from red to yellow. Serial dilutions were performed using cultures that had been inoculated with biocide to determine how effective each biocide is at killing bacteria with 10, 30, and 60 minutes of contact time as compared to a control. The biocides tested can be distinguished by either a quick kill or slow kill biocide. A quick kill biocide will effectively reduce the number of bacteria with very little contact time; while a slow kill biocide will take an hour or longer to reduce the number of bacteria. Therefore, the media vials are monitored for 24, 48, 72 hours, and 1 week. The results showed that the control, including no TTPC changed steadily from red to pale yellow over 72 hours at 37° C. and both 50% solution TTPC (5 ppm) and 5% solution TTPC (30 ppm) were shown to be fast acting biocides that killed the bacteria within a 10 minute contact time.

Example 2

Figure 2:
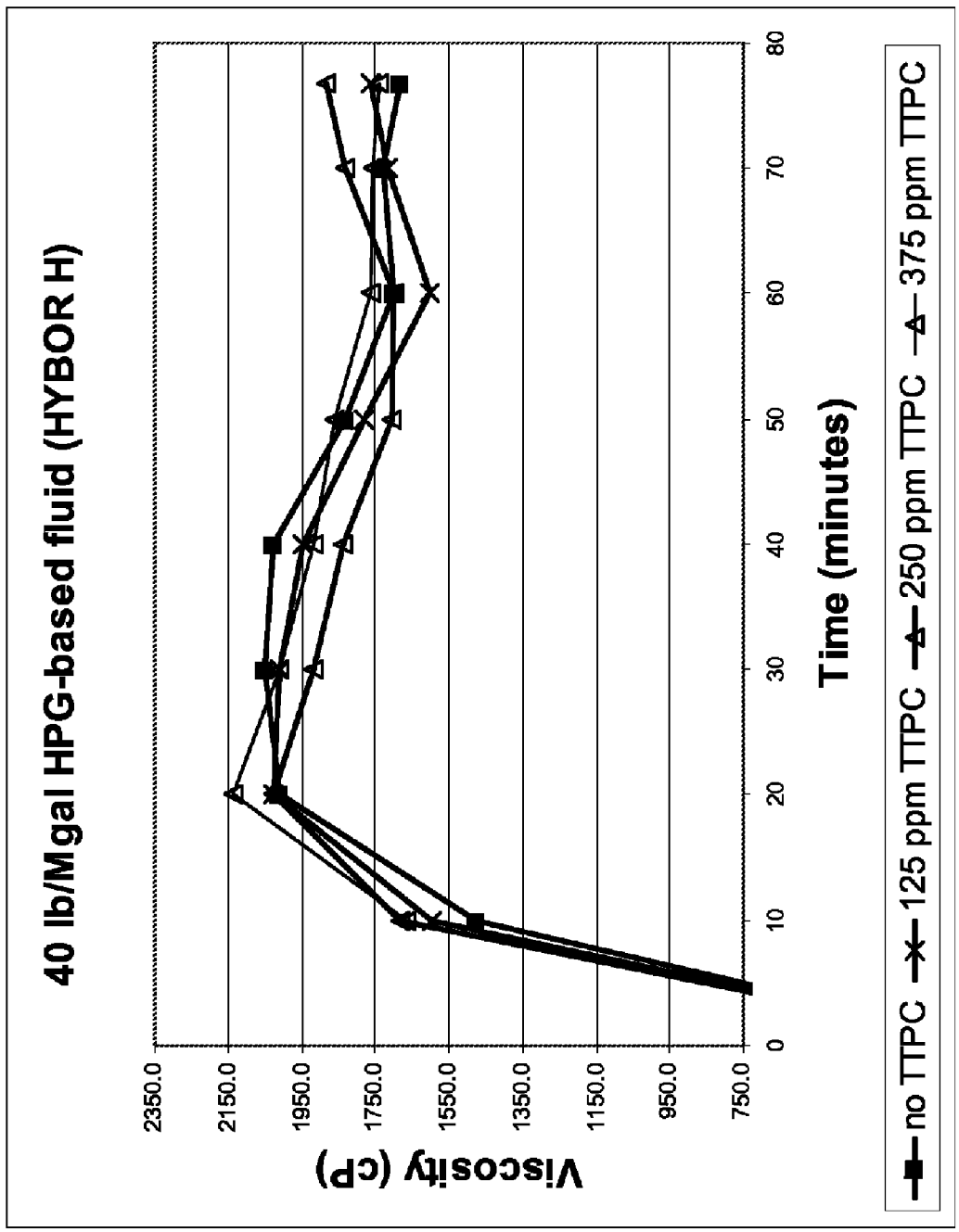
FIG. 2 shows compatibility of HPG-based fluid and TTPC.

First, a treatment fluid containing 35 pptg (pounds per thousand gallons) carboxymethyl hydroxypropyl guar (CM-HPG) fluid (SIROCCO, commercially available from Halliburton Energy Services, Inc. of Duncan, Okla.) with a pH of approximately 10.1 at 250° F. was tested and found to be compatible with TTPC up to about 250 ppm, as shown in FIG. 1. Not shown in FIG. 2 is the starting viscosity of each of the tested fluids, which was as follows: 117.1 for the control, 140.1 for the fluid containing 125 ppm TTPC, 116.2 for the fluid containing 250 ppm TTPC, and 147.4 for the fluid containing 375 pp, TTPC.

Next, a 40 lb/Mgal hydroxypropyl guar (HPG) based fluid (HYBOR H, commercially available from Halliburton Energy Services, Inc. of Duncan, Okla.) containing 1 gptg GasPerm 1000 (a microemulsion surfactant commercially available from Halliburton Energy Services, Inc. of Duncan, Okla.) (as used herein "gptg" refers to gallons per thousand gallons) and 4% KCl tested at 225° F. and was found to be compatible with TTPC up to about 375 ppm, as shown in FIG. 2. Not shown in FIG. 2 is the starting viscosity of each of the tested fluids, which was as follows: 160.2 for the control, 172.9 for the fluid containing 125 ppm TTPC, 185.5 for the fluid containing 250 ppm TTPC, and 188.7 for the fluid containing 375 pp, TTPC.

Figure 3:
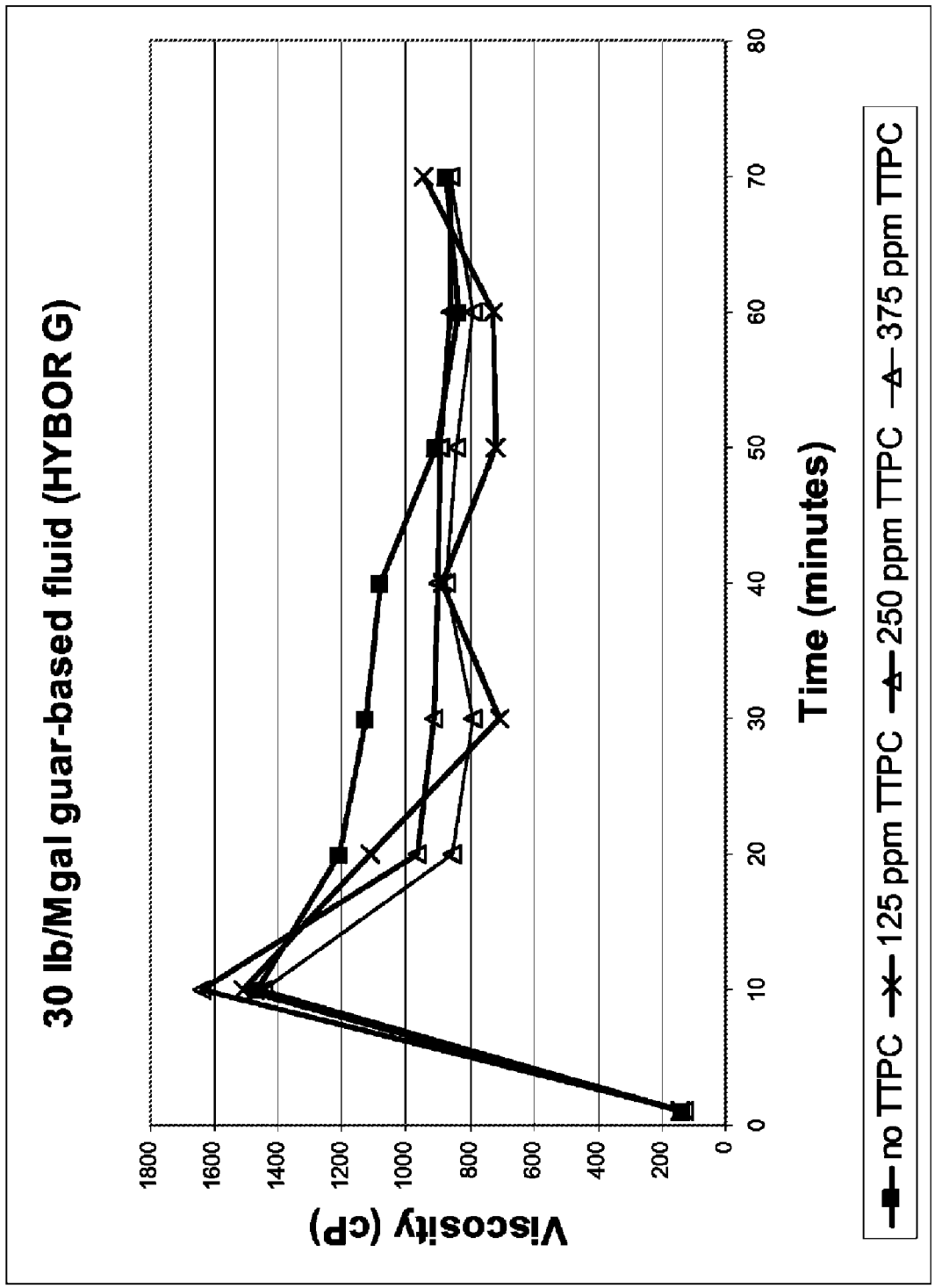
FIG. 3 shows compatibility of guar-based fluid (HYBOR G) and TTPC.

Next a 30 lb/Mgal guar-based fluid (HYBOR G, commercially available from Halliburton Energy Services, Inc. of Duncan, Okla.) containing 1 gptg GasPerm 1000 (a solvent-surfactant microemulsion blend commercially available from Halliburton Energy Services, Inc. of Duncan, Okla.) and 5 pptg sodium thiosulfate (as used herein "pptg" refers to pounds per thousand gallons) and tested at 225° F. and was found to be compatible with TTPC up to about 375 ppm, as shown in FIG. 3. The starting viscosity of each of the tested fluids, was as follows: 138.1 for the control, 141.3 for the fluid containing 125 ppm TTPC, 125.7 for the fluid containing 250 ppm TTPC, and 128.8 for the fluid containing 375 pp, TTPC.

Figure 4:
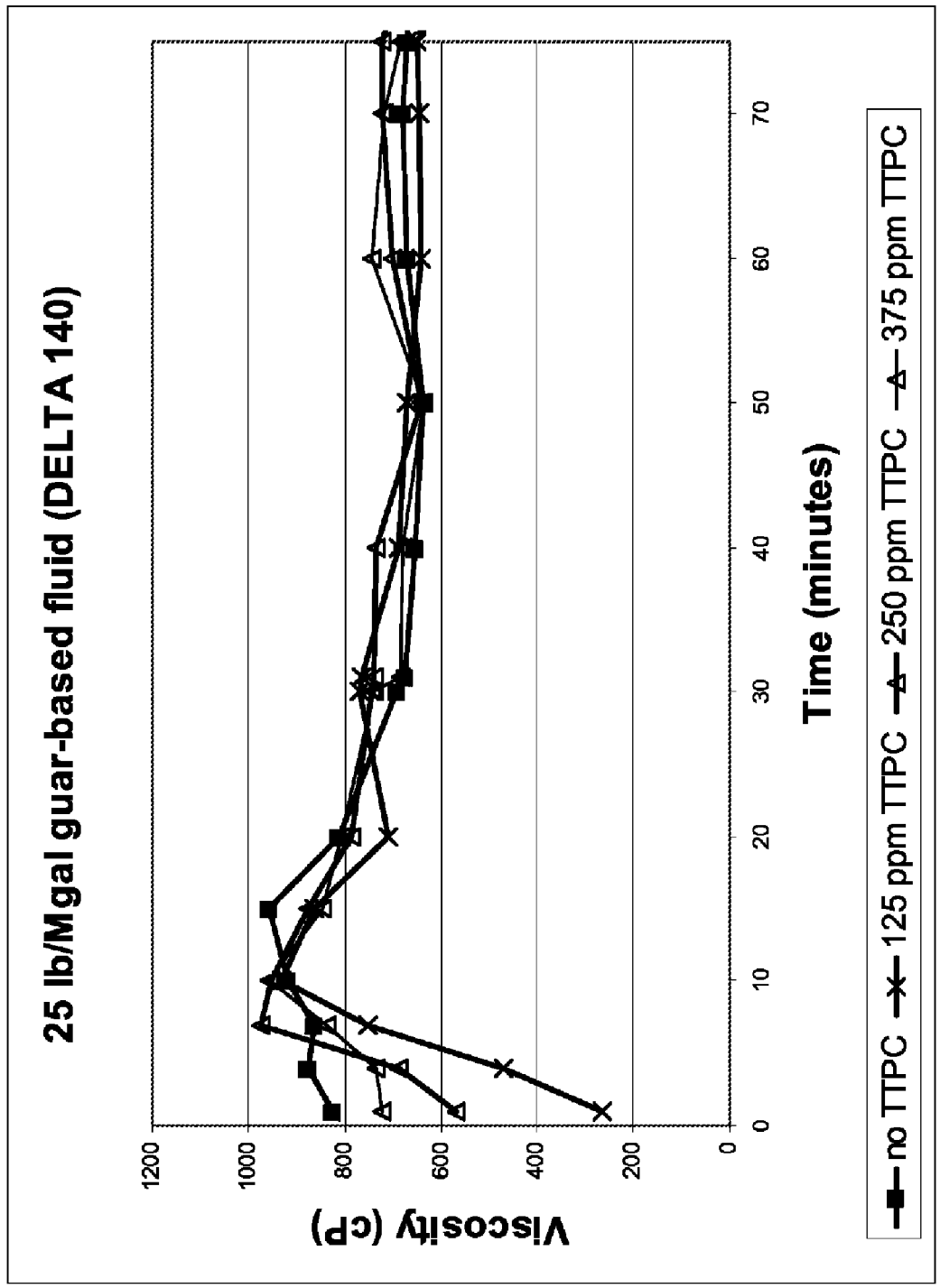
FIG. 4 shows compatibility of guar-based fluid (DELTA 140) and TTPC.

Next a 25 lb/Mgal guar-based fluid (DELTA 140, commercially available from Halliburton Energy Services, Inc. of Duncan, Okla.) with 2 gptg tetramethylammonium chloride and 3 gptg BC-140 (a borate crosslinker commercially available from Halliburton Energy Services, Inc. of Duncan, Okla.) tested at 140° F. and was found to be compatible with TTPC up to about 375 ppm, as shown in FIG. 4. The starting viscosity of each of the tested fluids, was as follows: 824.2 for the control, 263.7 for the fluid containing 125 ppm TTPC, 567.3 for the fluid containing 250 ppm TTPC, and 721.6 for the fluid containing 375 pp, TTPC.

Figure 5:
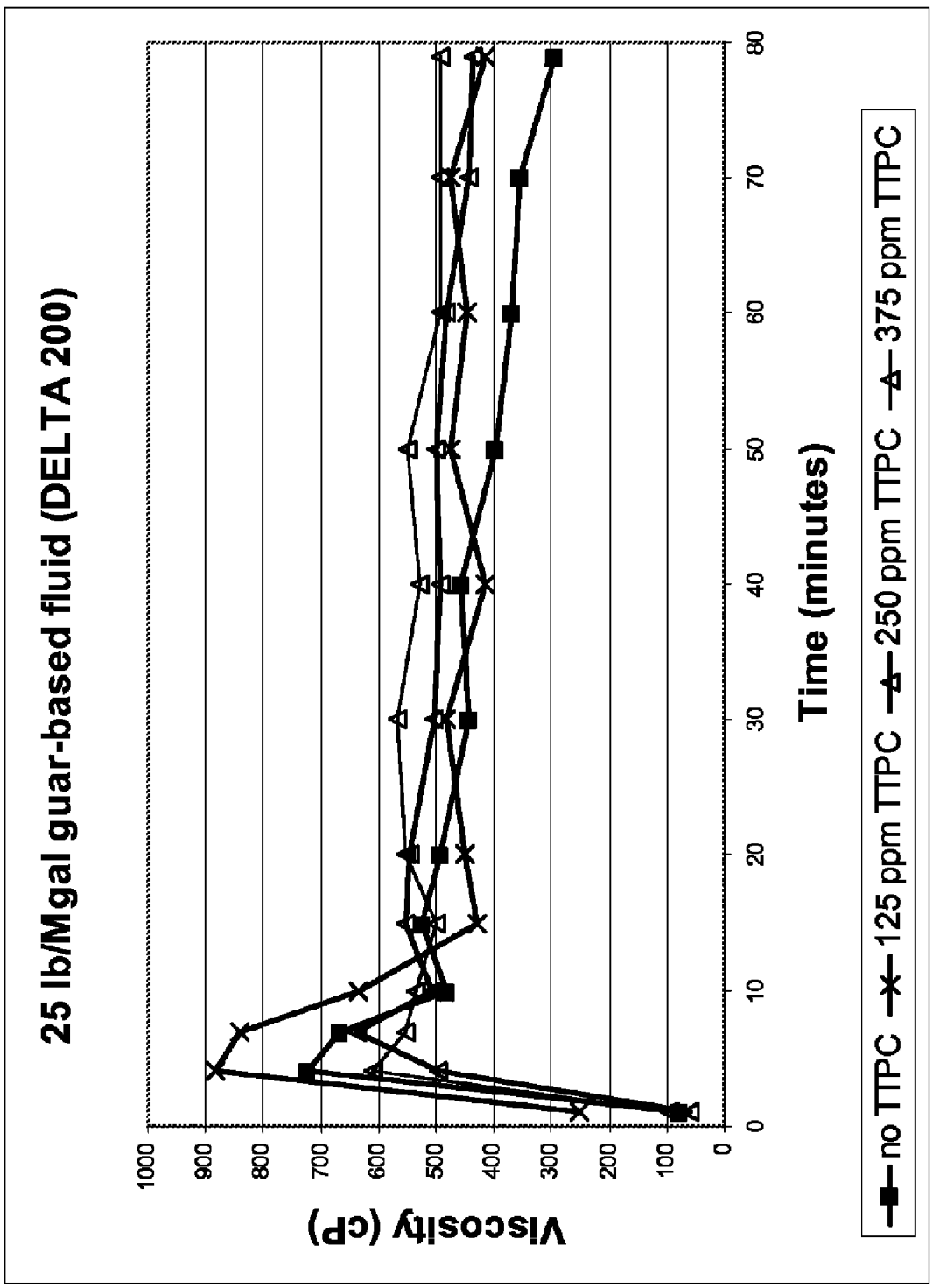
FIG. 5 shows compatibility of guar-based fluid (DELTA 200) and TTPC.

Next a 25 lb/Mgal guar-based fluid (DELTA 200, commercially available from Halliburton Energy Services, Inc. of Duncan, Okla.) with 2 gptg Clayfix II and 2.5 gptg BC-200 UC (a borate crosslinker commercially available from Halliburton Energy Services, Inc. of Duncan, Okla.) tested at 204° F. and was found to be compatible with TTPC up to about 375 ppm, as shown in FIG. 5. The starting viscosity of each of the tested fluids, was as follows: 77.0 for the control, 251.9 for the fluid containing 125 ppm TTPC, 59.7 for the fluid containing 250 ppm TTPC, and 96.8 for the fluid containing 375 pp, TTPC.

Figure 6:
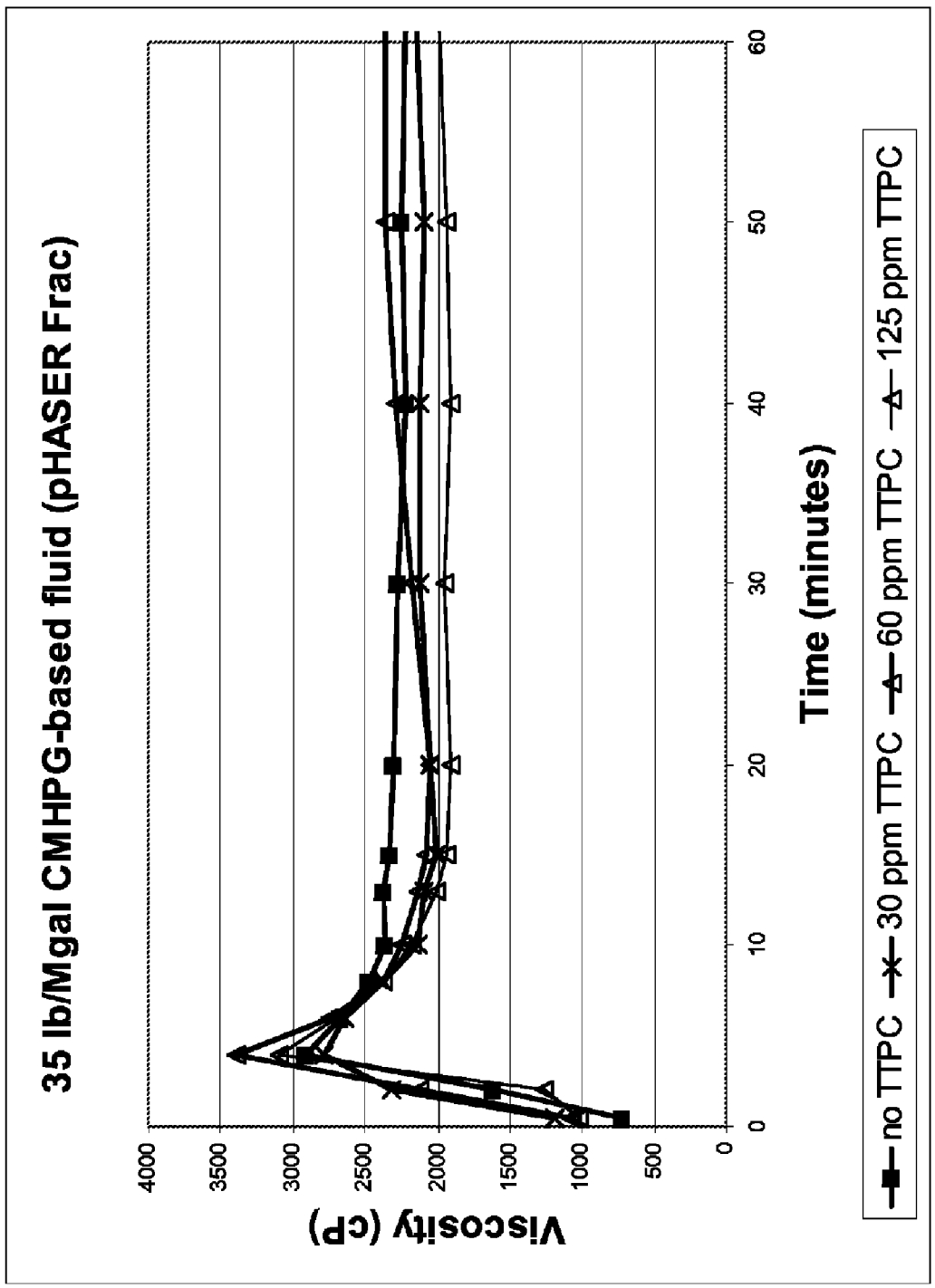
FIG. 6 shows compatibility of CMHPG-based fluid (PHASER FRAC) and TTPC.

Next a 35 lb/Mgal CMHPG-based fluid (pHaser Frac, commercially available from Halliburton Energy Services, Inc. of Duncan, Okla.) with 2 gptg tetramethylammonium chloride, 1.1 gptg of a pH buffer comprising ammonium acetate and acetic acid, and 1.4 gptg CL-37 (a zirconium crosslinker commercially available from Halliburton Energy Services, Inc. of Duncan, Okla.) was tested at 225° F. and was found to be compatible with TTPC up to about 125 ppm, as shown in FIG. 6. The starting viscosity of each of the tested fluids, was as follows: 719.1 for the control, 1182.63 for the fluid containing 30 ppm TTPC, 1067.5 for the fluid containing 60 ppm TTPC, and 1015.8 for the fluid containing 125 pp, TTPC.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is hereby specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of treating a portion of a subterranean formation, comprising:
    providing a treatment fluid, particulates, and tri-n-butyl tetradecyl phosphonium chloride (TTPC) wherein the TTPC is in liquid form or in solution;
    coating the TTPC onto the particulates;
    placing a degradable coating onto the particulates coated with TTPC;
        wherein the degradable coating is a polysaccharide, a cellulose, a chitosan, a protein, an aliphatic polyester, a poly(lactide), a poly(glycolide), a poly($\epsilon$-caprolactone), a poly(hydrobutyrate), a poly(anhydride), an aliphatic polycarbonate, a poly(ortho ester), a poly(amino acid), a poly(ethylene oxide), a poly(vinylidene chloride), or a polyphosphazene;
    combining the particulates coated with TTPC with the treatment fluid to create a suspension; and,
    placing the suspension into the portion of the subterranean formation.

2. The method of claim 1 wherein the particulates are fluid loss control agents.

3. The method of claim 1 wherein the suspension further comprises an additional biocide selected from the group consisting of an oxidizing biocide, an organic non-oxidizing biocide, or a combination thereof.

4. The method of claim 1 wherein the suspension further comprises a scale inhibitor.

5. The method of claim 1 wherein the suspension further comprises additional additives selected from the group consisting of salts, buffers, pH control additives, gas generators, enzyme substrates, additional surfactants, fluid loss control additives, acids, gases, surface modifying agents, tackifying agents, foamers, corrosion inhibitors, additional scale inhibitors, catalysts, clay control agents, friction reducers, antifoam agents, bridging agents, dispersants, flocculants, $H_2S$ scavengers, $CO_2$ scavengers, oxygen scavengers, lubricants, weighting agents, relative permeability modifiers, resins, wetting agents, coating enhancement agents, and combinations thereof.

* * * * *